(12) United States Patent
Sakamoto

(10) Patent No.: US 8,120,787 B2
(45) Date of Patent: Feb. 21, 2012

(54) INFORMATION TERMINAL DEVICE HAVING DRAWING PRINTING FUNCTION, DRAWING PRINTING METHOD, AND PRINTED MATTER

(75) Inventor: Hiroshi Sakamoto, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 1204 days.

(21) Appl. No.: 11/814,258

(22) PCT Filed: Jan. 18, 2005

(86) PCT No.: PCT/JP2005/000550
§ 371 (c)(1),
(2), (4) Date: Jul. 18, 2007

(87) PCT Pub. No.: WO2006/077627
PCT Pub. Date: Jul. 27, 2006

(65) Prior Publication Data
US 2008/0130019 A1    Jun. 5, 2008

(51) Int. Cl.
*G06F 15/00* (2006.01)
*G06K 1/00* (2006.01)
(52) U.S. Cl. .......................... 358/1.1; 358/1.3
(58) Field of Classification Search .............. 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS
2002/0165769 A1    11/2002  Ogaki et al.

FOREIGN PATENT DOCUMENTS

| JP | 11-311526 A | 11/1999 |
| JP | 11311526 A | * 11/1999 |
| JP | 2002-150108 A | 5/2002 |
| JP | 2002-156901 A | 5/2002 |
| JP | 2002-244550 A | 8/2002 |
| JP | 2002-329102 A | 11/2002 |

OTHER PUBLICATIONS

Notification of Transmittal of Translation of the International Preliminary Report on Patentability (Forms PCT/IB/338 and 326) of International Application No. PCT/JP2005/000550 mailed Aug. 2, 2007 with Forms PCT/IB/373 and PCT/ISA/237.

(Continued)

*Primary Examiner* — Thierry Pham
(74) *Attorney, Agent, or Firm* — Westerman, Hattori, Daniels & Adrian, LLP

(57) ABSTRACT

An information terminal device having a drawing printing function to print a drawing such as a map or a route map is enabled to print the drawing without any reduction on rolled printing paper having a limited width. The information terminal device includes a printer for printing data, and an angle calculator. On the basis of the drawing data having the data of a drawing containing a bent point and the data of the angle of bend at that bent point, the angle calculator calculates the angle index, at which the rolled paper is folded to correspond to the bent point, and calculates the printing data, which divides the drawing at each bent point and which is taken in the longitudinal direction of the rolled paper, that is, the blank length which discontinues the drawing at the folded portion determined by the angle index. On the basis of the angle index and the blank length, the printer divides the drawing at each bent point and makes the printing data taken in the longitudinal direction of the rolled paper.

12 Claims, 11 Drawing Sheets

OTHER PUBLICATIONS

International Search Report of PCT/JP2005/000550, date of mailing May 10, 2005.

Supplementary European Search Report dated Apr. 7, 2011, issued in corresponding European Patent Application No. 05703787.1.

* cited by examiner

Fig. 4

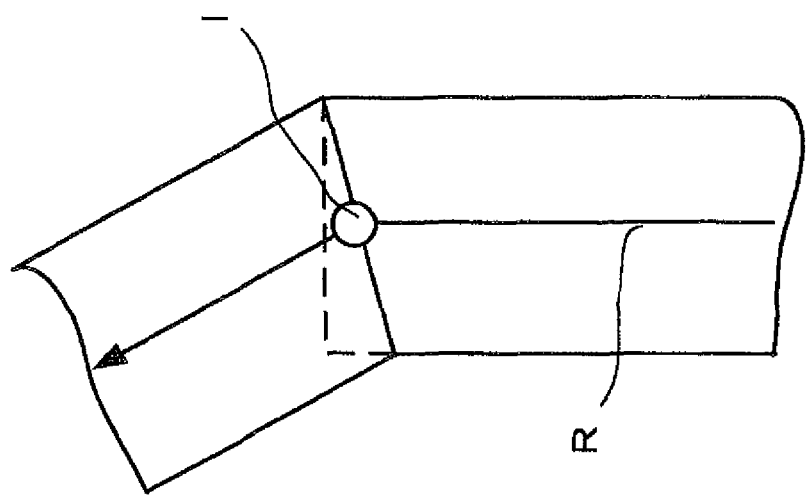
Fig. 8(c)
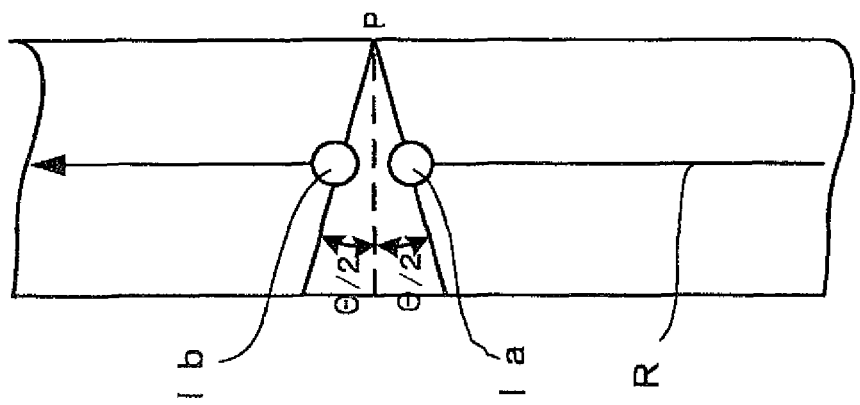
Fig. 8(b)
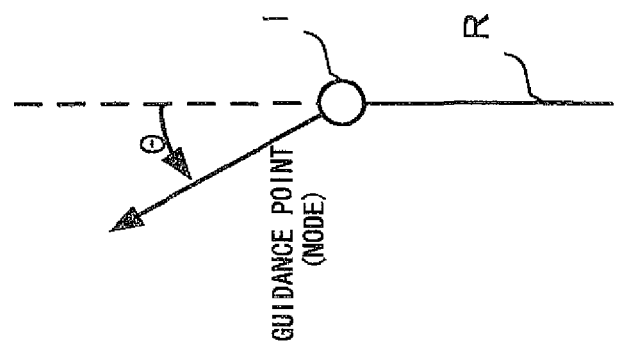
Fig. 8(a)
Fig. 8

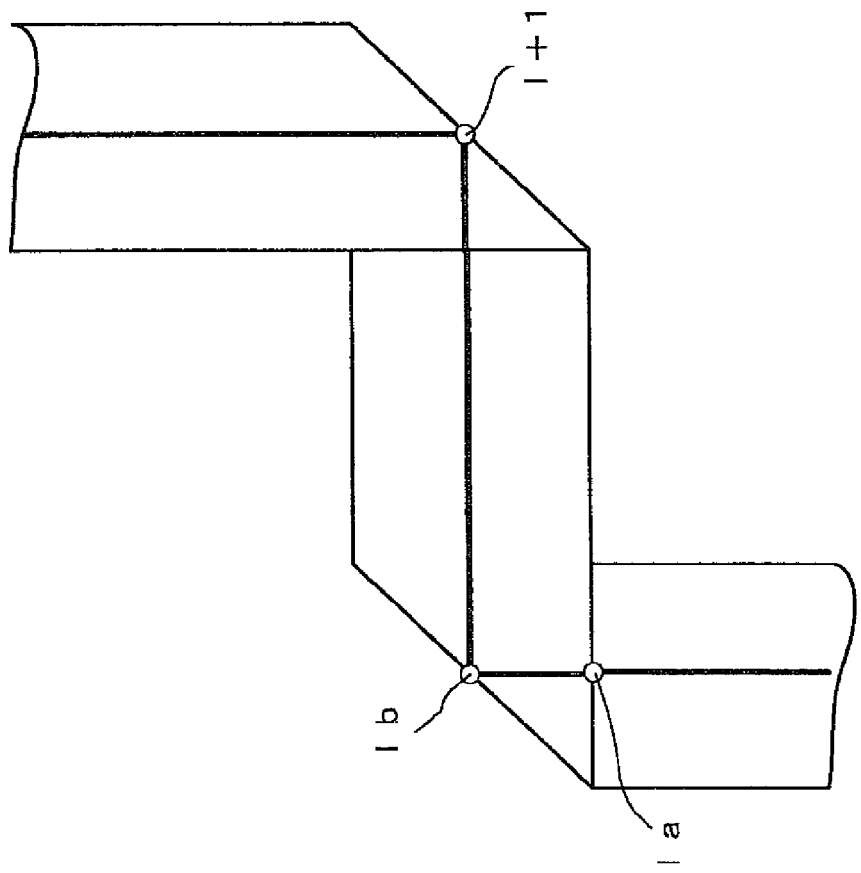
Fig. 9(b)
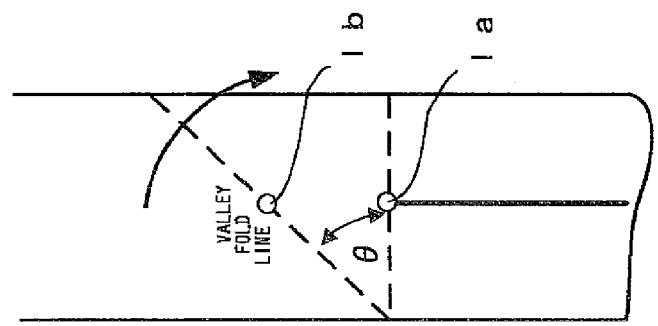
Fig. 9(a)
Fig. 9

INFORMATION TERMINAL DEVICE HAVING DRAWING PRINTING FUNCTION, DRAWING PRINTING METHOD, AND PRINTED MATTER

TECHNICAL FIELD

The present invention relates to an information terminal device to be installed at a convenience store or other types of store. The present invention relates to an information terminal device having a diagram printing function whereby a user uses the information terminal device to receive delivery of map information for a desired location, a guide diagram for a store, a route guide diagram, or other information from a variety of information distribution servers; or to select and print map information for a variety of destinations, a guide diagram for a store, a route guide diagram, or another diagram stored in the information terminal device. The present invention particularly relates to an information terminal device having a diagram printing function that can print a drawing without any reduction on a roll of printing paper having a limited width, a diagram printing method, and printed matter.

BACKGROUND ART

In conjunction with recent developments in information communication technology, information terminal devices have been installed at hotels, convenience stores, and other types of stores. A user visiting the hotel or convenience store operates the information terminal device; information stored in the information terminal device relating to nearby theaters, restaurants, theme parks, a variety of stores for shopping, and the like is output; special offers related to the information are acquired; or access is given to a variety of information distribution servers via the internet or another transmission network, and desired information or services are obtained.

As an example of such a system, a system is known in which a user uses an information terminal device installed at a hotel, convenience store, or another type of store to select a restaurant or a variety of stores for shopping that are stored in the information terminal device; and an associated guide diagram is output, or coupons or service tickets for the store are output. An additional example of such a system is known in which an information terminal device installed at a hotel, convenience store, or another type of store is used, and a user visiting the hotel or convenience store operates the information terminal device to access a variety of information distribution servers via the internet or another communication network; and reservations for a train, hotel, restaurant, or the like are made. Alternatively, a guide diagram to the restaurant or hotel is output.

As an example of such a system, a map information distribution system is disclosed in the below-described Patent Reference 1 (Japanese Laid-open Patent Application No. 2002-150108), wherein, when a user inputs a destination using a store terminal at a convenience store, macro map information to the destination is provided. In addition, a system for providing guide information accompanied by special offers is disclosed in the below-described Patent Reference 2 (Japanese Laid-open Patent Application No. 2002-329102), wherein a terminal device constituting a POS system as a sales management system is given multiple functions; and coupons, service tickets, and other guide information are provided using sales statistics data.

The map information distribution system disclosed in Patent Reference 1 is installed at a plurality of stores in a same chain and comprises a card having a recording part, input means for inputting data related to the card, an issuing terminal for issuing the card via the input means, and a map information service terminal for printing map information. The system is configured so that the card issued by a first issuing terminal is inserted into a first map information service terminal and a destination is selected, whereby map information printed by the same process using a second or subsequent map information service terminal will be more detailed in regard to the destination than the first printed information.

The system for providing guide information disclosed in the Patent Reference 2 combines a POS system for managing information relating to merchandise purchased at the store where the sales management system terminal is installed and information related to attributes of the customer making the purchase; an image making system that can generate and print out on paper guide information including a map to the location of the advertiser suitably selected by an information selecting part, advertising information relating to the advertiser, and coupons, service tickets, or other special offer information; and a statistical processing part. Statistical processing relating to the merchandise information, client attribute information, and special offer use information can thereby be performed; and advertisers can provide customers with better matched detailed information. Improvements are thereby made that enable the advertising to have a greater effect.

[Patent Reference 1]: Japanese Laid-open Patent Application No. 2002-150108 (FIG. 1, FIG. 2)

[Patent Reference 2]: Japanese Laid-open Patent Application No. 2002-329102

DISCLOSURE OF THE INVENTION

Problems the Invention is Intended To Solve

The printing means of the information terminal device or POS terminal device constituting the systems of Patent Reference 1 or Patent Reference 2 is configured to print on roll paper that is relatively narrow. For example, in a POS terminal device, printing is generally performed using paper having a width of about 6 cm in order to print a receipt. Wider roll paper has a width of about 8 cm. On the other hand, such a guide diagram printed on the roll paper includes, e.g., a guide route (arrow line) from a current location where the information terminal device is installed to a desired nearby °° outlet for a store, as shown in FIG. 10. The size of such diagrams covers a certain area.

When a roll paper that is relatively narrow and of limited width is used for printing, no problems will be presented when a receipt, a letter string, or a simple diagram is printed. However, when a map, guide diagram, guide route diagram (referred to below simply as a "guide diagram"), or another such diagram is printed, the width (length in a transverse direction) of the diagram to be printed is calculated so as to conform to the width of the roll paper on which the diagram is to be printed, and image data for printing is created while the horizontal to vertical ratio of the original diagram, i.e., a length in the vertical direction, is reduced. In other words, a diagram such as a guide diagram shown in FIG. 10 is printed on the relatively narrow roll paper as a diagram having reduced horizontal and vertical dimensions as shown in FIG. 11.

Therefore, as a result of being printed on the roll paper, the guide diagram is reduced in size vertically and horizontally, and a problem arises in that the printed material will only provide landmarks and the route in a manner that is extremely difficult to distinguish from the printed guide diagram.

However, no reference is made to a printing function for resolving the above-described problems in the terminal device constituting the map information distribution system and guide information providing system disclosed in Patent Reference 1 and Patent Reference 2.

The inventors conducted a variety of studies to resolve the foregoing problems, and perfected the present invention as a result. They found that by calculating an angle at a bend point of a route leading to a landmark, forming a blank space where a fold is to be made in accordance with the angle, and printing the route as a straight line, the information can be printed on a roll paper without the broad diagram being reduced. In addition, the route can be viewed in a continuous state by folding the printed paper.

In other words, in order to overcome these drawbacks, an object of the present invention is to provide an information terminal device having a diagram printing function that can print a diagram without reduction on a rolled printing paper having a limited width, a diagram printing method, and printed matter for an information terminal device having a diagram printing function that a user uses to receive map information for a desired location, a guide diagram for a store, a route guide diagram, or other information from a variety of information distribution servers. The user may alternatively use the information terminal device to select and print information relating to map data for a variety of destination locations, a guide diagram for a store, a route guide diagram, or another diagram stored in the information terminal device.

Means for Solving the Abovementioned Problems

In order to achieve the aforementioned object, the invention according to a first aspect provides an information terminal device having a diagram printing function and comprising printing means for outputting printing data onto a continuous roll of paper having a predetermined width; wherein the method is characterized in that the information terminal device has printing data generating means for generating the printing data, and angle calculating means;

the angle calculating means calculates, on the basis of diagram data comprising data of a diagram having a bend point and data of an angle of bend at that bend point, an angle index at which the roll paper is to be folded in correspondence with the bend point; and calculates a length of a blank portion, which is printing data that divides the diagram at each bend point and proceeds along the longitudinal direction of the roll paper, and which breaks the continuity of the diagram at the folded portion determined by the angle index; and the printing data generating means generates printing data for dividing the diagram at each bend point and proceeding along the longitudinal direction of the roll paper, based on the angle index and the blank length.

The invention according to a second aspect is the invention according to the first aspect, characterized in that the angle calculating means determines the angle of bend from an angle formed by a link in a digital diagram included in the diagram data.

The invention according to a third aspect is the invention according to the first aspect, characterized in that the printing means has a double-sided printing function for printing on both sides of a roll paper; and the printing data generating means generates printing data so that a diagram to be printed is continuously printed on a front surface and back surface of the roll paper when the roll paper is folded along a line of the angle index.

The invention according to a fourth aspect is the invention according to the first aspect, characterized in that the diagram data has a guide route that uses a location where the information terminal device is installed as a departure point and continues to a destination point for each of a predetermined number of destination points; and is stored in advance in the information terminal device.

The invention according to a fifth aspect is the invention according to the first aspect, characterized in that the information terminal further comprises communication means and input means, sets a desired departure point and destination point, and transmits route searching conditions to an information distribution server; the diagram data has a guide route located by the information distribution server; and the information terminal device receives and prints the corresponding diagram data.

The invention according to a sixth aspect is the invention according to the fifth aspect, characterized in that the departure point is a location where the information terminal device is installed.

The invention according to a seventh aspect provides a diagram printing method for an information terminal device having a diagram printing function comprising printing means for outputting printing data onto a continuous sheet of roll paper having a predetermined width; wherein the method is characterized in that:

the information terminal device comprises printing data generating means for generating printing data angle calculating means; and the method comprises:

a step for calculating, by the angle calculating means on the basis of diagram data comprising data of a diagram having a bend point and data of an angle of bend at that bend point, an angle index at which the roll paper is to be folded in correspondence with the bend point;

a step for calculating a length of a blank portion, which is printing data that divides the diagram at each bend point and proceeds along the longitudinal direction of the roll paper, and which breaks the continuity of the diagram at the folded portion determined by the angle index; and a step for generating, by the printing data generating means on the basis of the angle index and the blank length, printing data for dividing the diagram at each bend point and proceeding along the longitudinal direction of the roll paper.

The invention according to an eighth aspect is the invention according to the seventh aspect, characterized in that the step in which the angle calculating means calculates the angle of bend determines the angle of bend from an angle formed by a link in a digital diagram included in the diagram data.

The invention according to a ninth aspect is the invention according to the seventh aspect, characterized in that the printing means has a double-sided printing function for printing on both sides of a roll paper; and the printing data generating means comprises a step for generating printing data so that a diagram to be printed is continuously printed on a front surface and back surface of the roll paper when the roll paper is folded along a line of the angle index.

The invention according to a tenth aspect is the invention according to the seventh aspect, characterized in that the diagram data has a guide route that uses a location where the information terminal device is installed as a departure point and continues to a destination point for each of a predetermined number of destination points, and that is stored in advance in the information terminal device.

The invention according to an eleventh aspect is the invention according to the seventh aspect, characterized in that the information terminal further comprises communication means and input means, and a step for setting a desired departure point and destination point and transmitting route searching conditions to an information distribution server; the diagram data contains a guide route located by the information distribution server; and the information terminal device has a step for receiving and printing the corresponding diagram data.

The invention according to a twelfth aspect is the invention according to the eleventh aspect, characterized in that the departure point is a position where the information terminal device is installed.

The invention according to a thirteenth aspect provides printed matter for displaying an image printed using a roll paper, characterized in that:

an angle index line for inwardly or backwardly folding the roll paper at a bend point of the diagram is set at an angle based on an angle of bend of the bend point;

the diagram is divided at each of the each bend points and printed along a longitudinal direction of the roll paper; and a diagram that is longer than a width of the roll paper is printed.

The invention according to a fourteenth aspect is the invention according to the thirteenth aspect, characterized in that a diagram printed on the printed matter is a guide diagram that has a guide route.

The invention according to a fifteenth aspect is the invention according to the thirteenth aspect, characterized in that the diagram has an outline; an angle index line for inwardly or backwardly folding the roll paper in correspondence with a bend point of the outline is set at an angle based on an angle of bend of the bend point; the outline of the diagram is divided at each of the bend points and printed along the longitudinal direction of the roll paper; and a diagram that is longer than a width of the roll paper is printed.

Effect of the Invention

In the inventions according to the first and second aspects, the information terminal device comprises printing data generating means for generating the printing data, and angle calculating means; the angle calculating means calculates, on the basis of diagram data comprising data of a diagram having a bend point and data of an angle of bend at that bend point, an angle index at which the roll paper is to be folded in correspondence with the bend point; and calculates a length of a blank portion, which is printing data that divides the diagram at each bend point and proceeds along the longitudinal direction of the roll paper, and which breaks the continuity of the diagram at the folded portion determined by the angle index; and the printing data generating means generates printing data for dividing the diagram at each bend point and proceeding along the longitudinal direction of the roll paper, based on the angle index and the blank length.

Therefore, the information terminal device can print a diagram having a wider range of length than the width of the roll paper. In other words, the diagram to be printed is printed on the roll paper without excessive reduction. When the printed paper is folded along the angle index line, the user can view the diagram as continuous printed matter in which a necessary and sufficient size is maintained.

In the invention according to the third aspect, in the invention according to the first aspect, the printing means has a double-sided printing function for printing on both sides of a roll paper; and the printing data generating means generates printing data so that a diagram to be printed is continuously printed on a front surface and back surface of the roll paper when the roll paper is folded along a line of the angle index.

Therefore, the information terminal device can print a diagram having a wider range of length than the width of the roll paper. In other words, the diagram to be printed is printed on the roll paper without excessive reduction. When the printed paper is folded along the angle index line, the user can view the diagram as continuous printed matter in which a necessary and sufficient size is maintained.

In the inventions according to the fourth through sixth aspects, the information terminal device can print a guide diagram including a guide route from a departure point to a destination or another diagram. The guide diagram is printed on the roll paper without excessive reduction. When the guide diagram is printed on the roll paper without excessive reduction and the printed paper is folded along the angle index line, the user can view the guide route as continuous printed matter in which a necessary and sufficient size is maintained.

The inventions according to the seventh through eighth aspects include a step in which the angle calculating means calculates, on the basis of diagram data comprising data of a diagram having a bend point and data of an angle of bend at that bend point, an angle index at which the roll paper is to be folded in correspondence with the bend point; and a step in which the angle calculating means calculates a length of a blank portion, which is printing data that divides the diagram at each bend point and proceeds along the longitudinal direction of the roll paper, and which breaks the continuity of the diagram at the folded portion determined by the angle index; and a step in which the printing data generating means generates printing data for dividing the diagram at each bend point and proceeding along the longitudinal direction of the roll paper, based on the angle index and the blank length.

Therefore, the information terminal device can print a diagram having a wider range of length than the width of the roll paper. In other words, the diagram to be printed is printed on the roll paper without excessive reduction. When the printed paper is folded along the angle index line, the user can view the diagram as continuous printed matter in which a necessary and sufficient size is maintained.

In the invention according to the ninth aspect, in the invention according to the seventh aspect, the printing means has a double-sided printing function for printing on both sides of a roll paper; and the printing data generating means comprises a step for generating printing data so that a diagram to be printed is continuously printed on a front surface and back surface of the roll paper when the roll paper is folded along a line of the angle index. The information terminal device can print a diagram having a wider range of length than the width of the roll paper. In other words, the diagram to be printed is printed on both sides of the roll paper without excessive reduction. When the printed paper is folded along the angle index line, the user can view the diagram as continuous printed matter in which a necessary and sufficient size is maintained.

In the inventions according to the tenth through twelfth aspects, the information terminal device can print a guide diagram including a guide route from a departure point to a destination or another diagram. The guide diagram is printed on the roll paper without excessive reduction. When the guide diagram is printed on the roll paper without excessive reduction and the printed paper is folded along the angle index line, the user can view the guide route as continuous printed matter in which a necessary and sufficient size is maintained.

In the invention according to the thirteenth aspect, in printed matter for displaying an image printed using a roll paper; an angle index line for inwardly or backwardly folding the roll paper at a bend point of the diagram is set at an angle based on an angle of bend of the bend point; the diagram is divided at each of the each bend points and printed along a longitudinal direction of the roll paper; and a diagram that is longer than a width of the roll paper is printed.

Therefore, printed matter can be provided in which the diagram to be printed is printed on the roll paper without excessive reduction. When the printed matter is folded along the angle index line, the user can view the diagram as a continuous print in which a necessary and sufficient size is maintained.

In the invention according to the fourteenth aspect, in the invention according to the thirteenth aspect, a diagram printed on the printed matter is a guide diagram that has a guide route. Therefore, the guide diagram is printed on the roll paper without excessive reduction. When the printed paper is folded along the angle index line, the user can view the guide route as continuous printed matter in which a necessary and sufficient size is maintained.

In the invention according to the fifteenth aspect, in the invention according to the thirteenth aspect, the diagram has an outline, and an angle index line for inwardly or backwardly folding the roll paper in correspondence with a bend point of the outline is set at an angle based on an angle of bend of the bend point; the outline of the diagram is divided at each of the bend points and printed along the longitudinal direction of the roll paper; and a diagram that is longer than a width of the roll paper is printed.

Therefore, a diagram that extends greatly in a two-dimensional fashion can be displayed on the roll paper. It is therefore possible to use methods such as those in which masking tape is used when large areas are painted. In addition, when an outer periphery of the diagram to be shown is expressed by vector data and is printed on the roll paper on the basis of a length and an angular variation of the vectors, The outer periphery can be made into a paper pattern for the outline of the diagram.

BRIEF DESCRIPTION OF THE DRAWINGS

FIG. 8 is a diagram that describes an instance where diagrams in which angles of bend in the guidance points on the guide route are different, with FIG. 8A being a diagram that describes the angles of bend in the guidance points on the guide route, FIG. 8B being a diagram that shows a format for printing the guide route on narrow paper using discontinuous and straight lines according to the angles of bend; and FIG. 8C being a diagram that shows the narrow paper folded according to the angles of the bend;

FIG. 9 is a diagram for describing an instance in which a diagram resulting from the printing method of the example according to the present invention is printed using a double-sided printing function, with FIG. 9A being a descriptive view showing a folding line, and FIG. 9B being a view showing a state in which the diagram printed on a front and back of a paper is folded;

KEY TO THE DIAGRAMS

Figure 1:
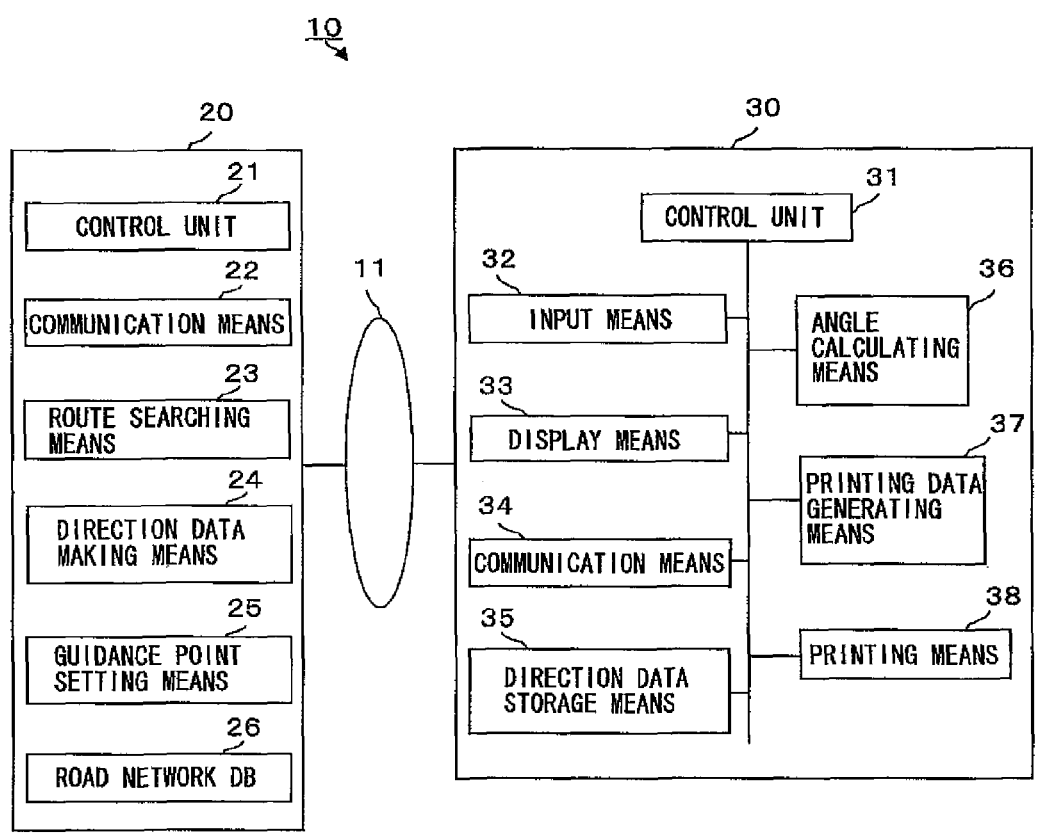
FIG. 1 is a block diagram showing a configuration of an information distribution system comprising an information terminal device having a diagram printing function according to an example of the present invention.

10 Information distribution system
12 Network
20 Information distribution server
21 Control unit
22 Communication means
23 Route searching means
24 Direction data making means
25 Guidance point setting means
26 Road network DB
30 Information terminal device
31 Control unit
32 Input means
33 Display means
34 Communication means
35 Direction data storage means
36 Angle calculating means
37 Printing data generating means
38 Printing means

BEST MODE FOR CARRYING OUT THE INVENTION

Specific examples of the present invention shall be described in detail below using examples and the drawings. A description is provided in the following examples of the present invention of an information terminal device that is connected to an information distribution server having route search and guide functions. However, the present invention is not limited thereto, and may also be used in an information terminal device that is operated as a standalone device or in conjunction with an information terminal device having a POS function; or may be a workstation or personal computer that can be connected to a network and to which a printing device that uses relatively narrow roll paper is connected.

Figure 2:
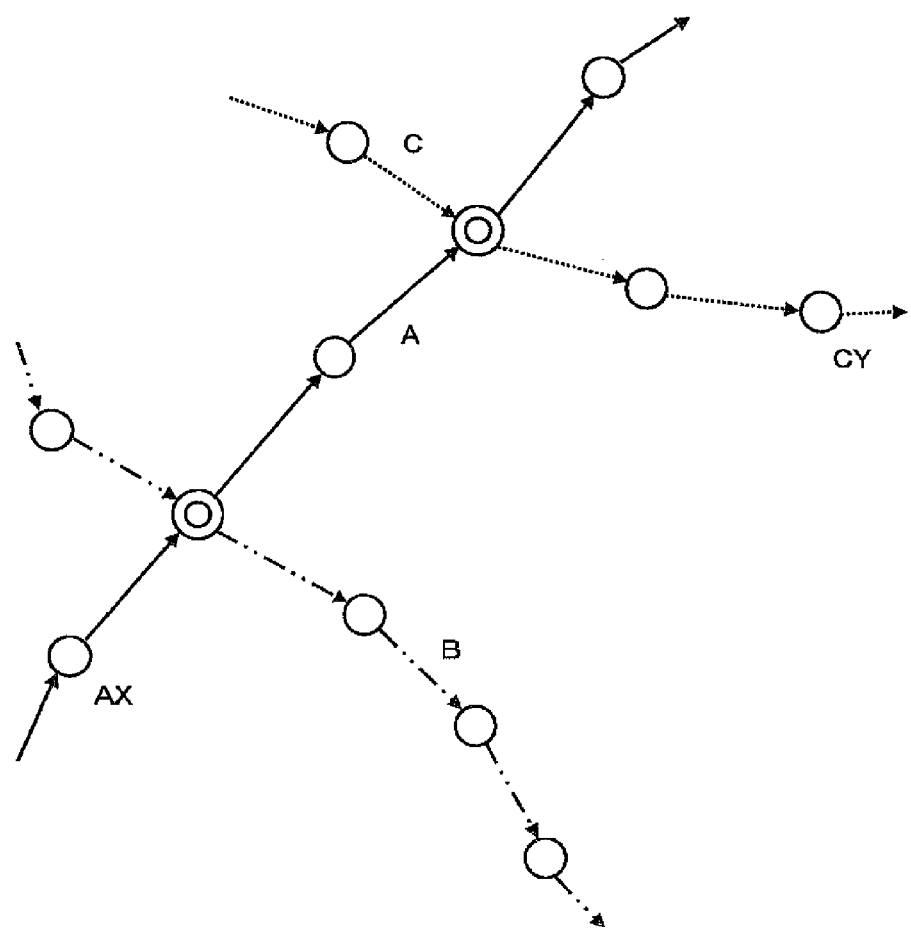
FIG. 2 is a schematic view showing a configuration of road network data for conducting a route search.
Figure 3:
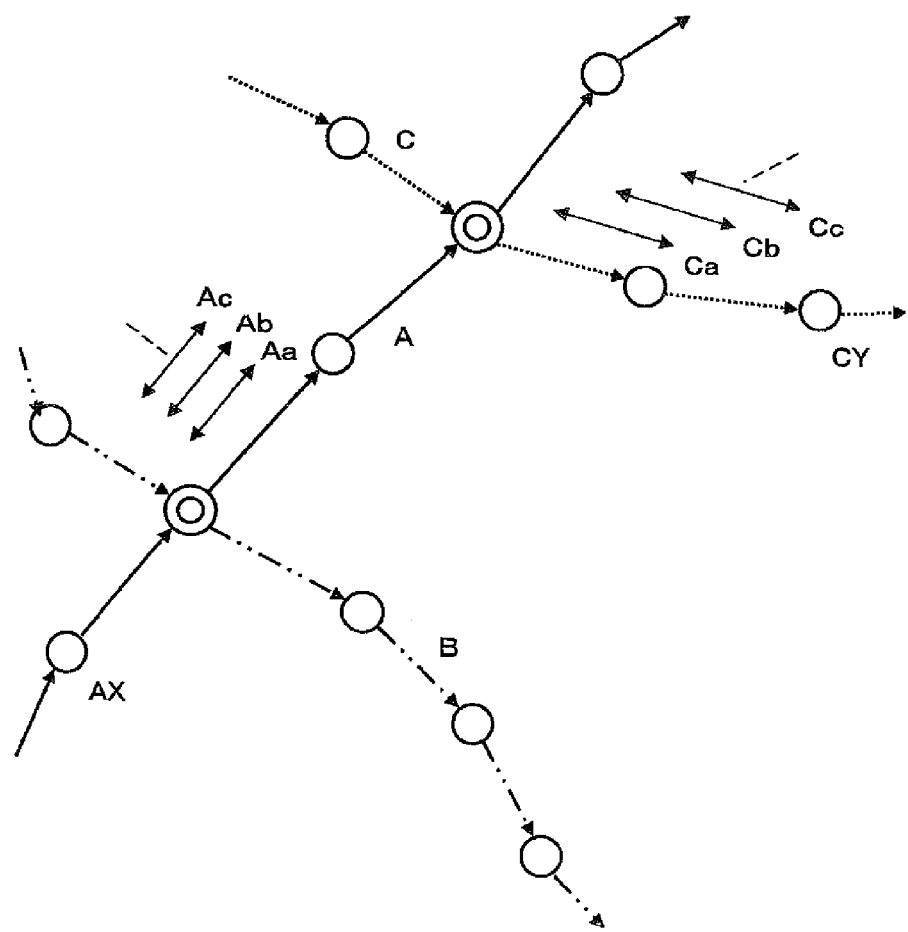
FIG. 3 is a schematic view for describing the road network data for conducting a route search using transportation facilities.
Figure 4A:
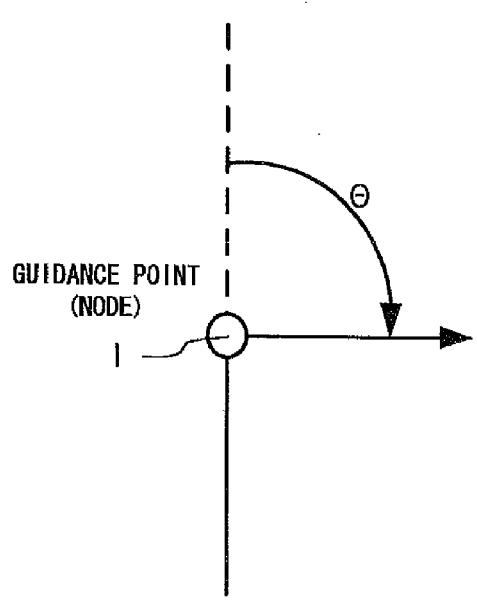
FIG. 4 is a diagram showing a diagram printing method according to the example of the present invention, with FIG. 4A being a diagram showing an angle of bend of a guidance point of a guide route, and FIG. 4B being a diagram showing a format for printing the guide route on narrow paper using discontinuous and straight lines according to the angle of bend.
Figure 4B:
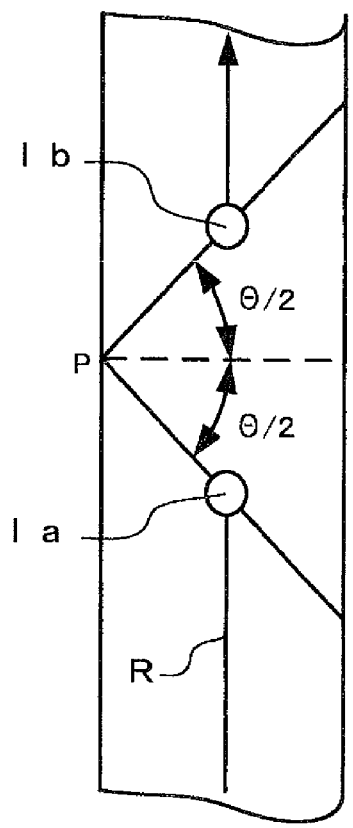
Figure 5:
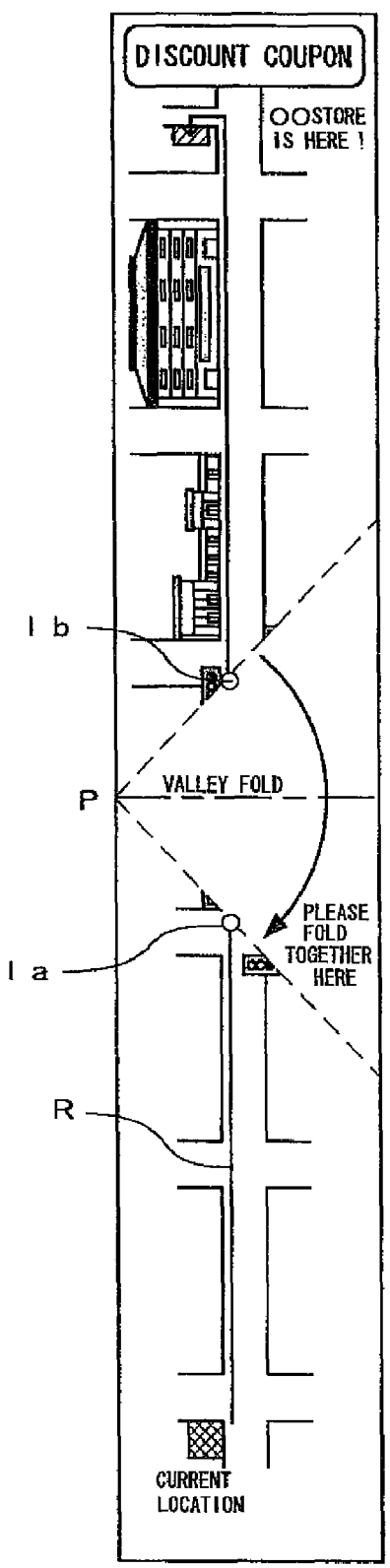
FIG. 5 is a diagram showing printed matter on which a diagram of FIG. 10 is printed by the printing method shown in FIG. 4.
Figure 6:
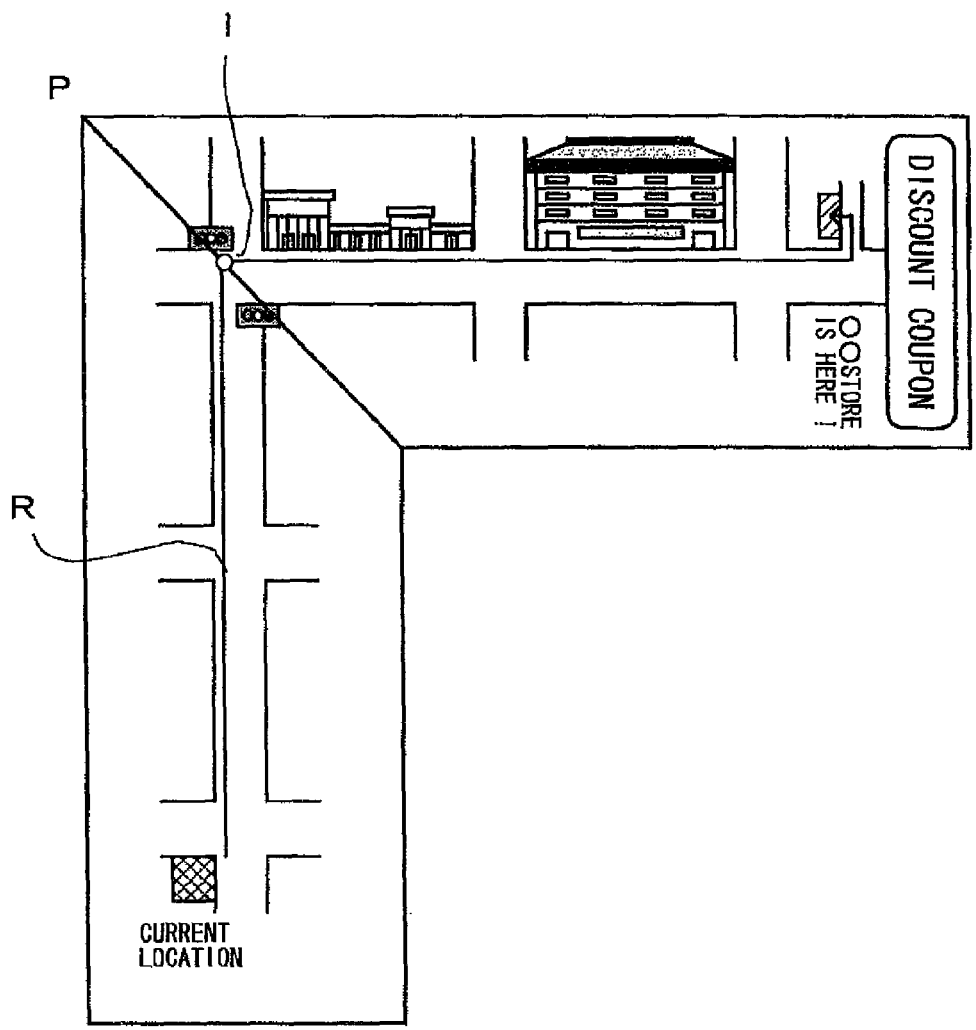
FIG. 6 is a diagram showing a usage state of the printed matter shown in FIG. 5, and is a diagram showing a state in which the printed diagram is folded and the bend of the guidance point can be viewed.
Figure 7:
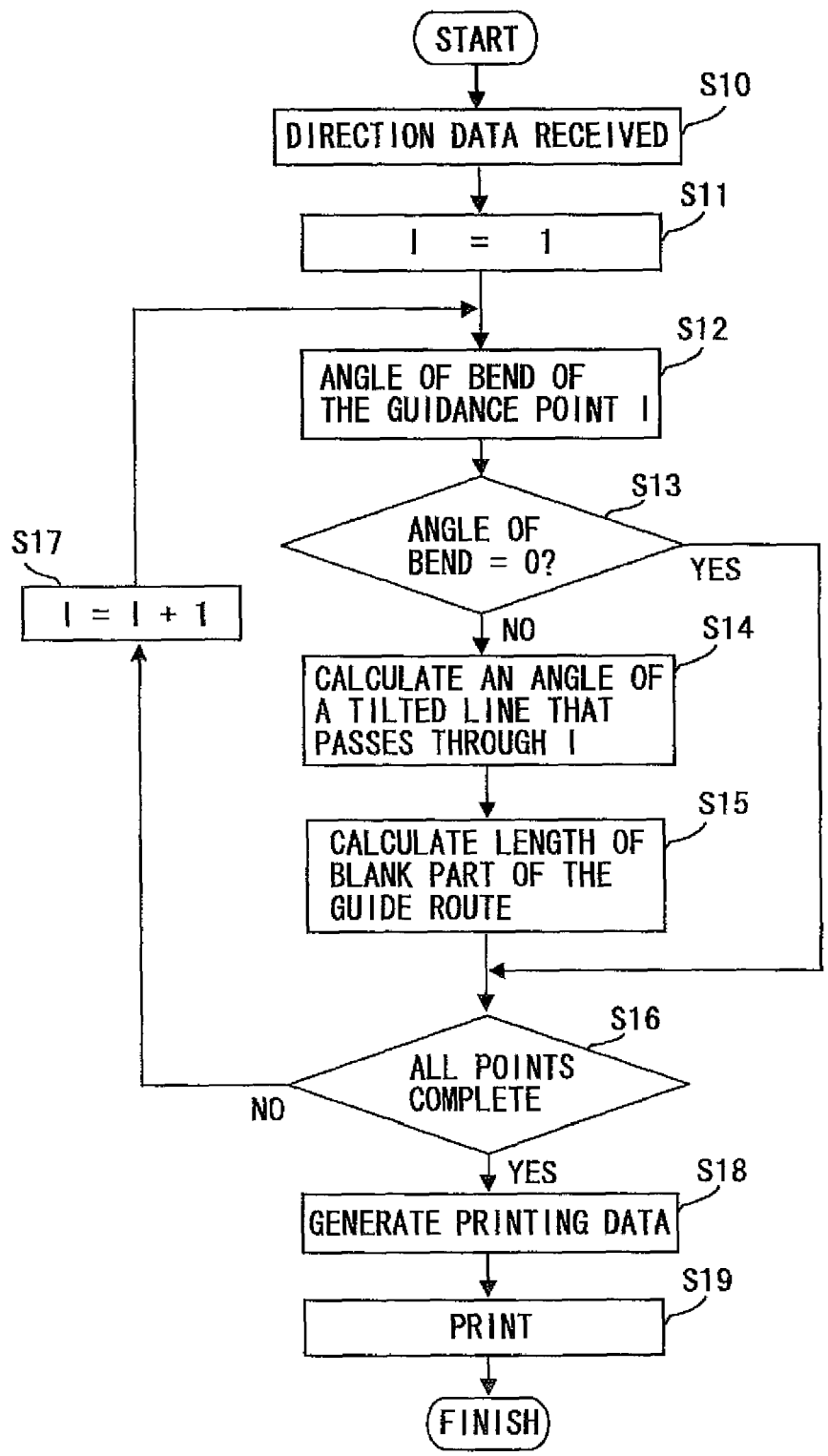
FIG. 7 is a flowchart showing a printing action process of the information terminal device according to the example of the present invention.
Figure 10:
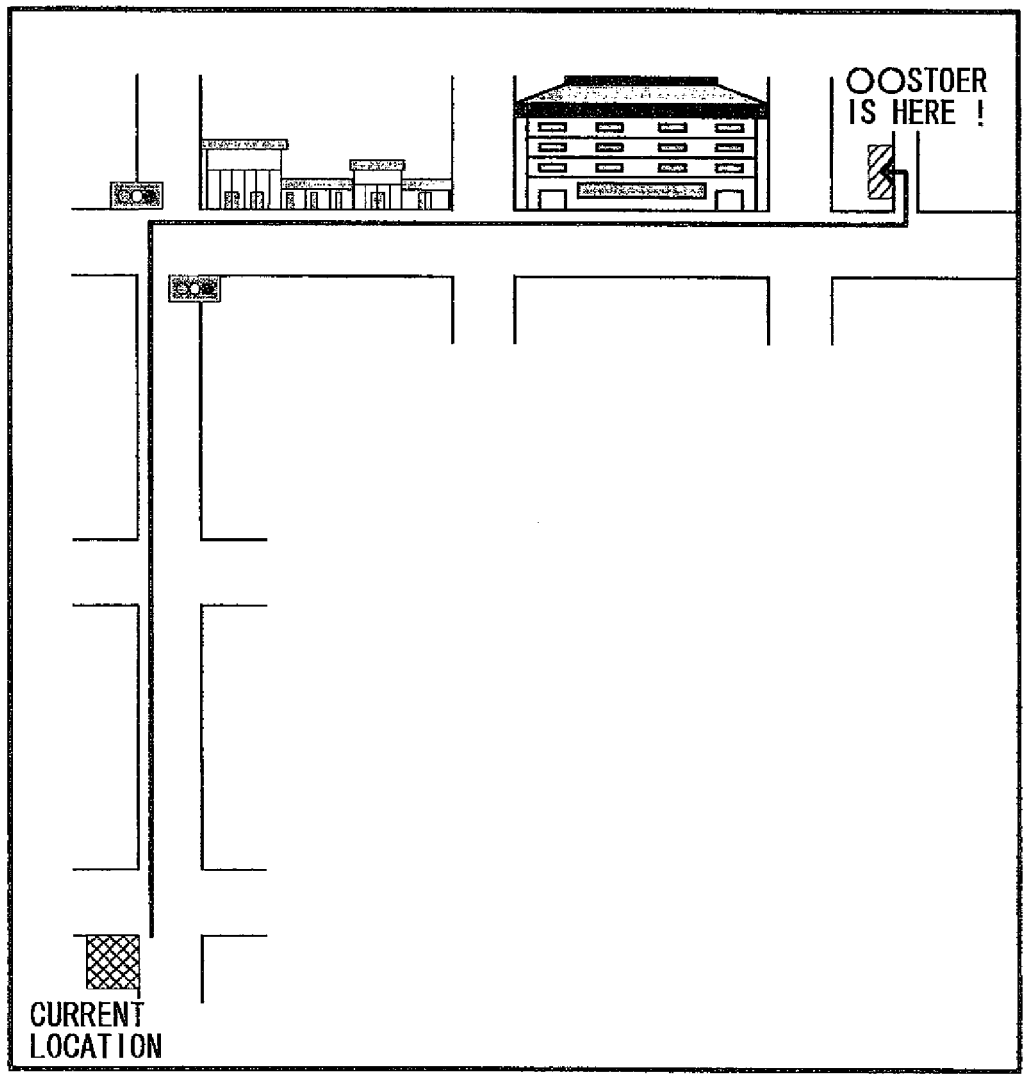
FIG. 10 is a schematic view showing an example of printed matter composed of a diagram printed by common printing means.
Figure 11:
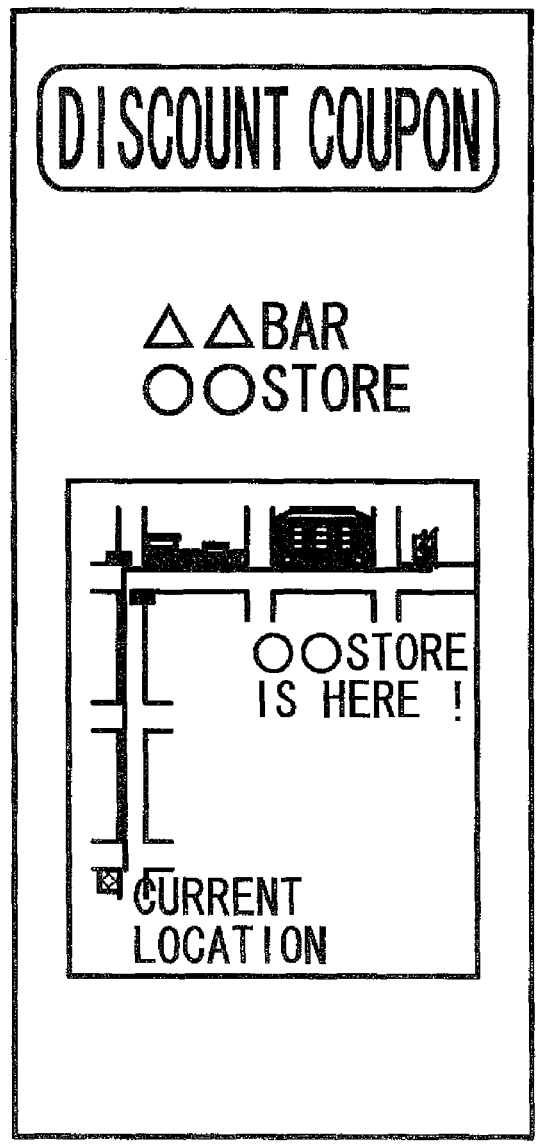
FIG. 11 is a schematic view showing an instance where the diagram of FIG. 10 is printed using a common information terminal device comprising printing means for printing on a relatively narrow roll of paper.

FIG. 1 is a block diagram showing a configuration of an information distribution system comprising an information terminal device having a diagram printing function according to an example of the present invention. FIG. 2 is a schematic view showing a configuration of road network data for conducting a route search. FIG. 3 is a schematic view for describing the road network data for conducting a route search using transportation facilities. FIG. 4 is a diagram showing a diagram printing method according to the example of the present invention, with FIG. 4A being a diagram showing an angle of bend of a guidance point of a guide route, and FIG. 4B being a diagram showing a format for printing the guide route on narrow paper using discontinuous and straight lines according to the angle of bend FIG. 5 is a diagram showing printed matter on which a diagram of FIG. 10 is printed by the printing method shown in FIG. 4. FIG. 6 is a diagram showing a usage state of the printed matter shown in FIG. 5, and is a diagram showing a state in which the printed diagram is folded and the bend of the guidance point can be viewed. FIG. 7 is a flowchart showing a printing action process of the information terminal device according to the example of the present invention. FIG. 8 is a diagram that describes an instance where diagrams in which angles of bend in the guidance points on the guide route are different, with FIG. 8A being a diagram that describes the angles of bend in the guidance points on the guide route, and FIG. 8B being a diagram that shows a format for printing the guide route on narrow paper using discontinuous and straight lines according to the angles of bend. FIG. 9 is a diagram for describing an instance in which a diagram resulting from the printing method of the example according to the present invention is printed using a double-sided printing function, with FIG. 9A being a descriptive view showing a folding line, and FIG. 9B being a view showing a state in which the diagram printed on a front and back of a paper is folded.

EXAMPLES

An information distribution system 10 according to the present example comprises an information terminal device 30 that is connected to an information distribution server 20 via the Internet, a dedicated line network, or another network 11 and that is installed in a hotel or store such as a convenience store, as shown in FIG. 1. The information distribution server 20 is a server similar to a route search server of a typical communication-type navigation system having a route search function, a route guide function, a map distribution function, and other functions.

The information distribution server 20 comprises a road network DB 26. The information distribution server 20 searches for an optimal route from the location where the information terminal device 30 is installed to a destination on the basis of information relating to the position of the destination transmitted from the information terminal device 30, and distributes map data and guide route data to the information terminal device 30. The information terminal device 30 displays the map data and guide route data distributed from the information distribution server 20 or prints and provides the data to a user.

In a typical navigation system, the departure point is an arbitrary location indicated by the user. However, in the present example, the information terminal device 30 is installed in a fixed state at a hotel or convenience store and the system is conceived for providing guidance using a nearby theater, theme park, restaurant, or retail shop as a destination set by the user visiting the hotel or convenience store. Therefore, the location at which the information terminal device 30 is installed is the departure point.

Map and road data stored in the road network DB 26 is data used to search for a route, and is the same as a database comprising a route search server in a typical navigation system. In other words, when a map (road) is composed of roads A, B, C as shown in FIG. 2, end points, intersections, turns, and the like of the roads A, B, C are nodes; roads connecting the nodes are indicated by directional links; and road network data is composed of node data (latitudes and longitudes of the nodes), link data (link numbers), and link cost data that is data relating to link cost (distance of the links or amount of time required to travel the link). In other words, in FIG. 2, the symbols ○ and ◉ indicate nodes, and the symbols ◉ indicate intersections of the roads. The directional links connecting the nodes are indicated by arrow-headed lines (solid line, dotted line, double-dot dashed line). Links are oriented in the upward and downward directions of the roads. However, in FIG. 2, only links oriented in the directions of the arrows are shown in order to simplify the diagram.

When a search is conducted for a route using such road network data as the database for conducting the route search, links continuing from a node at the departure point to a node at the destination are traced, the link cost thereof is tabulated, a search is conducted for a route having the lowest tabulated link cost, and the guiding data is given. In other words, in FIG. 2, when a search is conducted for a route in which a departure point is assumed to be a node AX and a destination is assumed to be a node CY, a link cost is tabulated for a link that travels the road A from the node AX, turns right at a second intersection, enters the road C, and leads to the node CY; and a search is conducted for a route having the lowest tabulated link cost. In FIG. 2, other routes leading from the node AX to the node CY are not shown. However, such other routes are present in reality. Therefore, a search is conducted for routes that lead from the node AX to the node CY, and the route having the lowest link cost among the routes is set as the optimal route. A well known method called the Dijkstra method is used to perform this method.

When the information distribution server 20 distributes a route search, a time guide, or other information relating to a train, airplane, or other mode of transportation, network data relating to the mode of transportation can also be stored in the road network DB 26. When a line of the mode of transportation in the data of the network for the mode of transportation is composed of, e.g., transportation lines A, B, C as shown in FIG. 3, stations located on the transportation lines A, B, C (or airports if the lines relate to aircraft) are nodes; segments connecting the nodes are indicated by directional links; and node data (longitude and latitude) and link data (link numbers) are network data. In FIG. 3, the symbols ○ and ◉ indicate nodes, the symbols ◉ indicate connecting points on the transportation lines (e.g., transfer stations), and the arrow-headed lines (solid lines, dotted lines, double-dot dash lines) indicate the directional links connecting the nodes. Links are oriented in both directions of the transportation lines. However, in FIG. 3, only links oriented in the directions of the arrows are shown in order to simplify the diagram.

However, link costs in travel networks for modes of transportation are different from those of road networks on a basic level. In other words, road networks have fixed and static link costs. However, in travel networks for modes of transportation, there exist a plurality of trains or airplanes (routes for individual trains and airplanes shall be referred to hereunder as "transportation means") that travel the transportation lines, departure times from a node and arrival times at the following node are established on each transportation means (prescribed by time table data and travel data), and each of the routes may not necessarily be linked to an adjacent node. For example, express and local trains may be present. In such instances, a plurality of different links may be present on the same transportation line, and time required to travel between nodes may differ according to the transportation means.

In the travel network for a mode of transportation shown in FIG. 3, a plurality of transportation means (routes) Aa through Ac . . . is present on the same link of the transportation line A, and a plurality of transportation means (routes) Ca through Cc . . . is present on the transportation line C. Therefore, the travel network for the mode of transportation differs from a simple road network. The amount of data relating to nodes, links, and link cost is in proportion to the total of data of the transportation means (routes for the individual airplanes or trains), and has dramatically more network data than a road network. Therefore, a larger amount of time is accordingly required to search for a route.

In order to search for a route from a certain departure point to a certain destination by using such travel network data for a mode of transportation, all transportation means that can be used (ridden) to reach the destination from the departure point must be searched, and the transportation means corresponding to the search conditions must be identified. For example, in FIG. 3, when a certain identified departure time is indicated so that the node AX of the transportation route A is the departure point, and a search is conducted for a route in which the node CY of the transportation route C is the destination, all transportation means among the transportation means Aa through Ac . . . that are available after the departure time and that travel on the transportation route A are selected for routes with sequential departure times. A search is then conducted, on the basis of an arrival time at a connecting node heading toward the transportation route C, within the transportation means Ca through Cc . . . that travel on the transportation route C for all combinations of transportation means after the specified time where the mode of transportation can be boarded at a connecting node (transfer node). The time required, number of transfers, and other aspects of the routes that include the connecting time (transfer time) are totaled; and guiding information is given.

The information distribution server 20 comprises a control unit 21, communications means 22, route searching means 23, direction data making means 24, and guidance point setting means 25. The control unit 21 is a microprocessor having RAM, ROM, and a processor, none of which are shown, and controls the operation of the components by a control program stored in the ROM. The communication means 22 is an interface for communicating with the information terminal device 30 via the network 11. The route searching means 23 conducts searches for an optimal route from a departure point to a destination while making reference to the road network DB 26. A well-known method called the Dijkstra method is used to conduct the search for a route.

The direction data making means 24 compiles the guide route (route from the departure point to the destination) found by the route searching means 23 into data for distributing to the information terminal device 30. The guidance point setting means 25 identifies a node of an intersection or junction included in the guide route, sets guidance for the travel direction (e.g., traveling straight, turning right or left) of the node, and sends the resulting data to the direction data making means 24. In other words, a route from the departure point to the destination (guide route), a guidance point on the guide route, and guiding information (e.g., traveling straight, turning right or left) associated with the guidance points is included in the direction data. The direction data is distributed to the information terminal device 30 and output by the printing means. In FIG. 1, display means, which is a monitor display means of the information distribution server 20; operation means for operating the information distribution server 20; and the like have been omitted.

As described above, the information distribution server 20 can conduct a search in which walking is the means of movement using the road network DB 26; and can conduct a search in which walking and a transportation means are the means of movement when the travel network data and time table data for the mode of transportation are stored in the road network DB 26. However, the present invention has a configuration in which a guide diagram distributed from the information distribution server 20 is printed. Details of the process for conducting a search for a route using walking and a transportation means are the same as in a typical navigation system. Therefore, a description of the route searching method shall be omitted.

The information terminal device 30 comprises a control unit 31, input means 32, display means 33, communication means 34, direction data storage means 35, angle calculating means 36, printing data generating means 37, and printing means 38. The control unit 31 is a microprocessor that has RAM, ROM, and a processor, none of which are shown, and controls the operation of the components by a control program stored in the ROM. The input means 32 is composed of number and letter keys, function keys, a selection key, and the like. A desired menu is selected from a menu screen displayed on the display means 33. Alternatively, the number and letter keys are operated to input a destination or another route searching condition. The communication means 34 is an interface for communicating with the information distribution terminal 20 via the network 11.

The information terminal device 30 is installed in a hotel or convenience store as described above. When a user operates the information terminal device 30 to select a destination and request a route guide, the location information of the departure point is the location of the hotel or convenience store where the information terminal device 30 is installed. In other words, the user operating the information terminal device 30 is a person visiting the hotel or convenience store, and, because a route guide to the destination with the hotel or convenience store as the point of origin is generally what is desired, the location at which the information terminal device 30 is installed is used for the departure point. It shall be apparent that when the user desires a route guide in which the point of origin is a station for a mode of transportation or the like in the vicinity of the hotel or convenience store where the information terminal device 30 is installed, the input means 32 or the like may be used to input the departure point.

In the information terminal device 30, the direction data storage means 35 is storage means for temporarily storing direction data distributed from the information distribution server 20. As described above, a route from the departure point to the destination (guide route), a guidance point of the guide route, and guidance information (e.g., traveling straight, turning right or left) for the guidance points are included in the direction data from the information distribution server 20. The angle calculation means 36 calculates an angle for printing the guide route as a discontinuous and straight line on narrow paper in accordance with an angle of bend of the guide route at the guidance points accompanying the right and left turns, the guidance points on the guide route being included in the direction data. This angle shall be referred to below as an "index angle."

The angle to be calculated is an angle formed by an end part of the paper (described hereafter using FIG. 4) and a guidance point to be printed. In other words, in the present invention, at a point where the route or road bends, the roll paper is folded and the route or road is continued and displayed at a correct angle; and a folding location and angle index for this purpose are formed and provided. A specific process thereof shall be described below.

Based on the angle of bend of the guide route at the guidance point as derived from the angle calculating means 36, the printing data generating means 37 generates printing data for printing the guide route as a discontinuous straight line on either side of triangular non-printed parts that correspond to the angle of bend (as described below with reference to FIGS. 4 through 8). The printing means 38 prints the printing data made by the printing data generating means 37. The printing means 38 is a printing mechanism configured to print the data on roll paper or other printing paper having a limited and relatively narrow width of about 6 cm.

FIG. 4 is a diagram showing a diagram printing method according to the example of the present invention, with FIG. 4A being a diagram showing an angle of bend of a guidance point of a guide route, and FIG. 4B being a diagram showing a format for printing the guide route on narrow paper using discontinuous and straight lines according to the angle of bend.

A guidance point I that turns right at an angle θ is present on a guide route R, as shown in FIG. 4A. In this instance, the guidance point I is an intersection and is an example of a guide route in which a right turn is made at a right angle at the intersection. At this time, the folding angle is calculated in the following manner. The guidance point I is extracted as a guidance point of the direction data distributed as described above by the information distribution server 20. Data relating to the road network (digital map) at this portion is composed of an intersection node, as well as an entering link and an exiting link. The entering link and exiting link are vector data. Therefore, the angular difference between the entering link and exiting link can be obtained.

When the angle is assumed to be θ as shown in FIG. 4A, the angle indices at which the print is to be made on the roll paper may be tilted θ/2 each from a width direction of the roll paper, as shown in FIG. 4B. An angle index line first is drawn out so as to pass through a guidance point Ia, a point of intersection with an edge of the roll paper is then assumed to be P, and the angle index lines are printed from the point of intersection P in contrasting fashion. The guide route R is printed as a discontinuous straight line by printing the route after the right turn from a point Ib that contrasts with Ia on the angle index line. The dotted line from P in FIG. 4B is an index line indicating a valley fold. When the guide diagram shown in FIG. 10 is printed using this process, [the guide diagram] is output as the printed matter shown in FIG. 5 from the printing means 38 of the information terminal device 30. When the paper that has been printed in this manner is folded along the angle index lines, the user can view the guide route as a continuous guide route such as that shown in FIG. 6. The guide diagram of FIG. 6 is printed in a state in which the size shown in FIG. 10 is maintained.

In the above-described example, the guidance point turned right at a right angle and the point P was at the left edge of the paper. However, when a left turn is made at a right angle, the point P will be on the right edge of the paper. In the above description, an example was given in which the angle index lines, valley fold index line, and the like were printed on the roll paper along with the guide diagram. However, when the printing means 38 has a finisher machine for forming a crease or inserting perforations or the like in the printed matter, the angle index line and the like do not necessarily need to be printed. The user can view the guide route as the guide diagram of FIG. 6 by folding the printed matter along the crease or perforations.

A process for printing a guide route or another diagram in the information terminal device 30 shall next be described with reference to the flowchart of FIG. 7. In the flowchart of FIG. 7, a request is made for a route guide (route search request) from the information terminal device 30 to a destination, the information distribution server 20 conducts a search for a route, direction data to the destination is generated, and the direction data is distributed to the information terminal device 30. First, the information terminal device 30 receives from the information distribution server 20 the direction data to the destination using the communications means 34 and temporarily stores the data in the direction data storage means 35 in the process of step S10.

In the process of step S12, the information terminal device 30 sets the pointer I as 1, and the angle calculating means 36 obtains an angle of bend for the first guidance point I on the guide route of the direction data. In step S13, the angle of bend is determined, and the process proceeds to step S16 if the angle of bend is "0", i.e., the route proceeds straight. If the angle of bend is a value other than "0", in step s14, a tilt of θ/2 for the angle index in the width direction of the roll paper described in FIG. 4 is calculated on the basis of the angle of bend θ.

The angle index line created by this angle index is first drawn out so as to pass through the guidance point Ia. Taking P as a point of intersection with the edge of the roll paper, the angle index line is then drawn from the point of intersection P in contrasting fashion, and a point Ib that contrasts with the guidance point Ia thereon is established. The guide route after the point at which the guidance point Ia turns from the contrast point Ib is then printed (see FIG. 4). In other words, the guide route R is blank between the guidance point Ia and the contrast point Ib, and is not printed. The length of the blank part can be readily calculated from the angle θ between angle index lines in the process of step S15.

The calculation of the angle index of the first guidance point I and the length of the blank space of the guide route at the bending part of the guidance point I is completed by the process from step S12 to step S15. When the process relating to the guidance point I is complete, a decision is made in step S16 as to whether the angle calculating means 36 has completed processes for all guidance points of the direction data. If not all guidance points have been processed, 1 is added to the point I in the process of step S17, the process returns to step S12, and processing is performed for an I+1 guidance point. This process is repeated, and all guidance points on the guide route are processed where the guide route turns right, turns left, or bends.

When all guidance point processes are complete in the process of step S16, the printing data generating means 37 generates printing data in the process of step S18 on the basis of the direction data distributed from the information distribution server 20, the angle index calculated for the guidance points by the above-described process, and the length of the blank part of the guide route. This data can be generated by the same method used to make image data for normal printing means. When the printing data has been made by the process of step S18, the printing means 38 then prints the printing data made by the process of step S18 onto roll paper in the process of step S19.

In the example of a guidance point shown in FIG. 4, the guide route turns right at a right angle at an intersection. However, the present invention is not limited to a right angle, and processing and printing can be performed by the above-described process for any angle. For example, when the guide route turns left at the guidance point I at an angle θ of 30 degrees, i.e., when the guide route turns left 30 degrees, the angle index is such that θ/2 is 15 degrees, as shown in FIG. 8A. First, the angle index line of the angle index is drawn out so as to pass through the guidance point Ia, and P is taken to be a point of intersection with the roll paper, as shown in FIG. 8B. In this instance, the point P is on the right edge of the paper. An angle index line is then printed in contrasting fashion from the point of intersection P. The guide route R is printed as a discontinuous straight line by having the route after the left turn printed from the point Ib that contrasts with Ia on the angle index line. Once the guide route has been printed, when the paper is valley folded on the dotted line (marker line showing the valley fold) from the point P of FIG. 8B, the guide route can be viewed as a guide diagram in which the guide route bends 30 degrees, as shown in FIG. 8C.

When the printing means 38 has a double-sided printing function, if a right turn is made at the guidance point I where the angle θ is 90 degrees, the angle index will be such that θ/2 is 45 degrees. A line that passes through the guide point I and is perpendicular to the edge of the roll paper is then drawn. A 45 degree angle index line (valley folding line) is formed from the point P that intersects with the left edge of the roll paper, and a guide route to the guidance point Ia is printed on a front surface of the roll paper, as shown in FIG. 9A. A guide route in a space that corresponds to the blank part and leads from the guidance point Ia and guidance point Ib on the angle index line is printed on the back surface of the roll paper, as shown in FIG. 9B. The length of the blank part can be readily calculated on the basis of the angle θ.

A guide route portion that is parallel to the length direction of the roll paper and extends from the guidance point Ib on the angle index line to the next guidance point I+1 is then printed. When the printed matter that is printed in this manner is folded back along the valley folding line, the guide route in which a right turn is made at a right angle can be viewed, as shown in FIG. 9B. In FIG. 9B, a portion is shown wherein a guidance route where a right turn is made at an angle θ of 90 degrees at a guidance point I+1, which is a guidance point following the guidance point I, is once again printed on the front surface.

No impediment to practical application will be presented in the above-described process wherein the information terminal device 30 receives the distribution of guide route data (direction data) from the information distribution server 20 and the guide diagram is printed on demand. This will be true even if a slight bend occurs between the guidance points, and the guide route between the guidance points is printed in a straight line as a guide diagram whose shape has been altered to conform to the roll paper. In addition, when the information terminal device 30 has data for a guide route to a predetermined destination and this data is printed, a configuration may be adopted in which printed data is generated using the above-described process, stored, and printed.

INDUSTRIAL APPLICABILITY

The present invention can be used in applications other than printing and displaying routes, and can be used to provide various types of directional information. For example, normally, chopstick cases from restaurants or other such establishments only bear information such as the name of the shop. However, a guide diagram for a shopping area where the restaurant is located can be printed and displayed, or a diagram showing the way to a nearby tourist attraction can be displayed according to the present invention. Both the shop and the area will accordingly be perceived with much greater impact. Furthermore, when a map for a specific route is purchased with the same intention as with the map information distribution system of Patent Reference 2 (Japanese Laid-out Patent Application Publication No. 2002-150108), a detailed map can be purchased merely on a simple roll paper. Companions riding together as passengers will find it highly entertaining reading out directions while folding the paper.

As described above, when the guide diagram is printed on a roll paper, the folding operation will be greatly facilitated if an attachment (finisher) is also provided for automatically forming a crease or perforations as a post process. In addition, the guide diagram may also be a map or guide route that has been actually folded and, e.g., bonded. Furthermore, the present invention is originally intended to display a guide diagram, route, or other diagram as printed matter. However, it is also possible to use the roll paper to display a diagram that extends two-dimensionally over a large surface. It is therefore possible to use methods such as those in which masking tape is used when large areas are painted. A paper pattern of the outline of the diagram can be produced when an outer periphery of the diagram to be shown is expressed by vector data and printed on the roll paper on the basis of lengths and angular variations of the vectors.

The invention claimed is:

1. An information terminal device having a diagram printing function and comprising:
printing means for outputting printing data onto a continuous roll of paper having a predetermined width; wherein the method is characterized in that
said information terminal device has printing data generating unit for generating the printing data, and an angle calculator;
said angle calculator calculates, on the basis of diagram data comprising data of a diagram having a bend point and data of an angle of bend at that bend point, an angle index at which said roll paper is to be folded in correspondence with said bend point, and calculates a length of a blank portion, which is printing data that divides said diagram at each bend point and proceeds along the longitudinal direction of said roll paper, and which breaks the continuity of said diagram at the folded portion determined by said angle index; and
said printing data generating unit generates, on the basis of said angle index and the blank length, printing data for dividing said diagram at each bend point and proceeding along the longitudinal direction of the roll paper.

2. The information terminal device having a diagram printing function according to claim 1, wherein said angle calculator determines said angle of bend from an angle formed by a link in a digital diagram included in said diagram data.

3. The information terminal device having a diagram printing function according to claim 1, wherein
said printer has a double-sided printing function for printing on both sides of a roll paper; and
said printing data generating unit generates printing data so that a diagram to be printed is continuously printed on a front surface and back surface of the roll paper when said roll paper is folded along a line of said angle index.

4. The information terminal device having a diagram printing function according to claim 1, wherein said diagram data has a guide route that uses a location where said information terminal device is installed as a departure point and continues to a destination point for each of a predetermined number of destination points; and is stored in advance in said information terminal device.

5. The information terminal device having a diagram printing function according to claim 1, wherein
said information terminal further comprises a communication unit and an input device, sets a desired departure point and destination point, and transmits route searching conditions to an information distribution server;
said diagram data has a guide route located by said information distribution server; and said information terminal device receives and prints the corresponding diagram data.

6. The information terminal device having a diagram printing function according to claim 5, wherein said departure point is a location where said information terminal device is installed.

7. A diagram printing method for an information terminal device having a diagram printing function comprising a printer for outputting printing data onto a continuous sheet of roll paper having a predetermined width:

said information terminal device comprising a printing data generating unit for generating printing data, and an angle calculator, said method comprising:

calculating by said angle calculator on the basis of diagram data comprising data of a diagram having a bend point and data of an angle of bend at that bend point, an angle index at which said roll paper is to be folded in correspondence with said bend point;

calculating a length of a blank portion, which is printing data that divides said diagram at each bend point and proceeds along the longitudinal direction of said roll paper, and which breaks the continuity of said diagram at the folded portion determined by said angle index; and generating, by said printing data generating unit, on the basis of said angle index and the blank length, printing data for dividing said diagram at each bend point and proceeding along the longitudinal direction of the roll paper.

8. The diagram printing method according to claim 7, wherein said angle calculating means calculates said angle of bend and determines said angle of bend from an angle formed by a link in a digital diagram included in said diagram data.

9. The diagram printing method according to claim 7, wherein said printer has a double-sided printing function for printing on both sides of a roll paper; and said printing data generating unit generates printing data so that a diagram to be printed is continuously printed on a front surface and back surface of the roll paper when said roll paper is folded along a line of said angle index.

10. The diagram printing method according to claim 7, wherein said diagram data has a guide route that uses a location where said information terminal device is installed as a departure point and continues to a destination point for each of a predetermined number of destination points, and that is stored in advance in said information terminal device.

11. The diagram printing method according to claim 7, wherein said information terminal further comprises a communication unit and an input unit, and a step for setting a desired departure point and destination point and transmitting route searching conditions to an information distribution server;

said diagram data contains a guide route located by said information distribution server; and said information terminal device has a step for receiving and printing the corresponding diagram data.

12. The diagram printing method according to claim 11, wherein said departure point is a position where said information terminal device is installed.

* * * * *